Sept. 4, 1956 M. K. KUNINS 2,761,959
VARIABLE COLOR LIGHT SOURCE
Filed Sept. 6, 1951 2 Sheets-Sheet 1
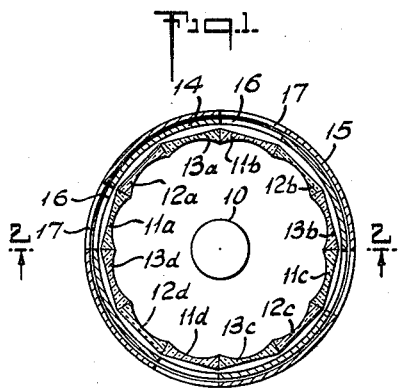
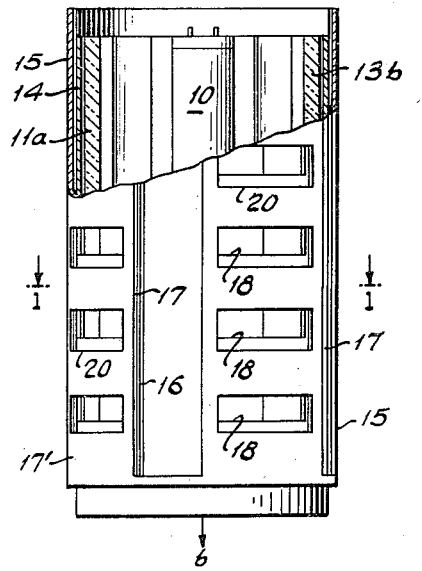
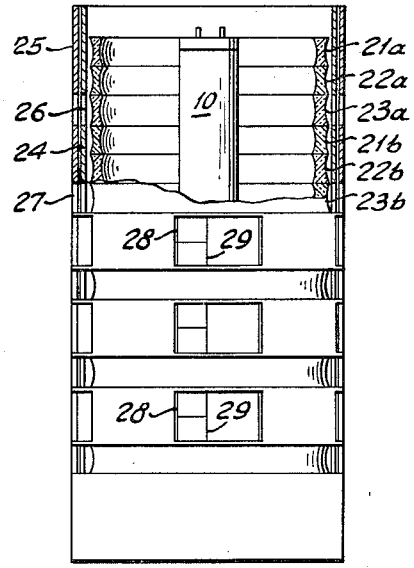
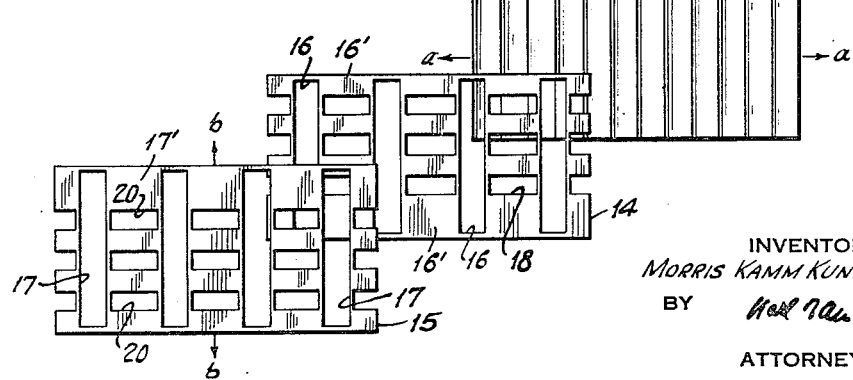
INVENTOR
MORRIS KAMM KUNINS
BY
ATTORNEY

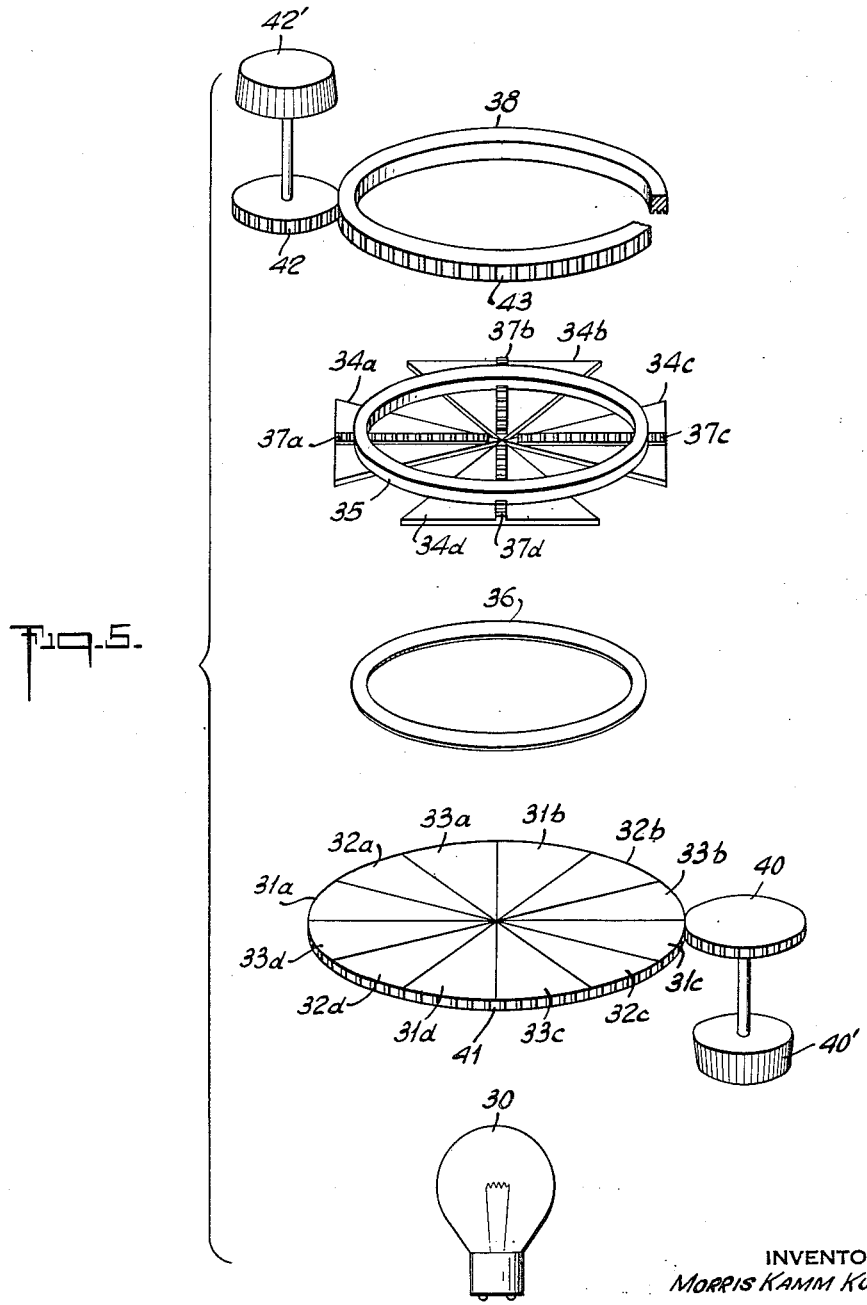

United States Patent Office 2,761,959
Patented Sept. 4, 1956

2,761,959

VARIABLE COLOR LIGHT SOURCE

Morris Kamm Kunins, New York, N. Y.

Application September 6, 1951, Serial No. 245,368

5 Claims. (Cl. 240—3.1)

The present invention relates to a variable color light source of the general type described in my U. S. Patent No. 2,515,236, issued July 18, 1950, and has for its main object to provide new and improved means for producing colored light of any desired hue and quality, more particularly, to produce light the spectral composition and degree of white saturation of which may be controlled in a simple and efficient manner.

Variable color light sources have various uses, both in the home and in the commercial field. When used in the home, they may serve for decorative as well as psychological purposes. In the commercial field, application may be made for display purposes in advertising, for theatre or stage lighting, or in the form of a color comparator or colorimeter for matching paints, inks and other colored objects or materials. These are but a few examples illustrative of the many fields of practical use of the invention.

Ancillary objects of the invention are to provide a variable color light source of the above character which is both simple in construction and easy to use; which is economical to manufacture; which is capable of providing colored light of any desired hue or spectral composition and having any degree of white saturation; and which produces colored light of a spectral composition and saturation both of which may be varied progressively within the visible spectrum or any other range of spectral colors for which the device has been designed.

With the foregoing objects in view, the invention involves generally the provision of a plurality of primary or component color light emitting elements or sources, preferably sources emitting red, green or blue light or any equivalent set of primary colors of the visible spectrum. Said sources are caused to emit variable amounts of light of their individual colors or hues which are blended together in varying ratios to obtain light of the composite colors resulting therefrom. There are provided, according to the present invention, further means to add to or blend with a color selected varying amounts of light of the complementary color, to thereby vary the degree of white saturation of any pure or composite spectral color selected. The composite colors thus obtained may be of any desired hue within the visible spectrum and of any degree of saturation of white light within the limits of zero to 100%.

The device for producing colored light to be described herein may be so constructed as to enable a substantially gradual or progressively adjustable control or variation by operating a first control member for selection of the hue or spectral composition and by operating a second control member for variation of the saturation of the selected color, in such a manner as to afford a continuously changeable color variation. The control may be either by manual operation or by the aid of mechanical control means, such as a motor, as may be desired.

The above and further objects and novel aspects of the invention will become more apparent from the following description in conjunction with the accompanying drawings, forming part of the specification, and wherein:

Figures 1 and 2 are, respectively, horizontal section and side views, the latter being shown partly broken away, of a cylindrical variable color light source constructed in accordance with the principles of the invention;

Figure 3 is an exploded view, more clearly showing the design and relative arrangement of the elements of Figures 1 and 2 shown in developed form or spread into a plane;

Figure 4 is a side view, similar to Figure 2, showing a modification of a cylindrical light control device according to the invention; and Figure 5 is an exploded view showing still another modification of a variable color light source constructed in accordance with the invention.

Like characters of reference identify like parts in the different views of the drawings.

Referring to Figures 1 to 3, there is shown an embodiment of the invention comprising a plurality of concentric cylindrical elements enclosing a light source and being adjustable relative to each other, to produce colored light of both varying hue and saturation continuously and progressive adjustable over a given range of variation determined by the design of the device. There is provided, for this purpose, a centrally mounted lamp or tubular light source 10, such as in the form of an incandescent or fluorescent lamp or the like, emitting white or substantially white light or light of any other composite spectral range for which the device has been designed.

The source or lamp 10 is surrounded by a plurality of adjacent sets of primary color filter elements 11a—12a—13a, 11b—12b—13b, 11c—12c—13c, etc. in the form of longitudinal strips and forming a closed cylindrical filter structure. In a preferred practical embodiment, the filters 11a, 11b, 11c, etc. may be of red, the filters 12a, 12b, 12c, etc. of green, and the filters 13a, 13b, 13c, etc. of blue color, corresponding to the normal or standard tri-stimulus primary colors well known in the art.

The filter elements, in the example shown, are of concave shape, to act as negative or dispersing lenses for the purpose of effecting a blending or intermingling of the component color light beams emitted outwardly by the filters, to thereby produce a corresponding light mixture or composite hue. However, blending of the primary color light beams may be accomplished by other known means, such as by sanding the surfaces of the filters or by the use of separate diffusing means in the form of a diffusing screen or the like enclosing the device, as shown and described in the above-mentioned patent.

Co-axially with the light source 10 and the composite filter structure, there is mounted a shutter or light intensity control device comprising, in the example shown, two cylindrical shutter elements 14 and 15 arranged one directly upon the other, further means being provided to enable a relative movement between the filter and shutter structures, in order to select any of the pure component colors or blend any two of the component colors into a desired spectral hue. For this purpose, both shutter cylinders 14 and 15 are provided with parallel longitudinal slots or openings 16 and 17 spaced from each other by solid or opaque portions 16' and 17', respectively, corresponding slots of both cylinders being in register with each other and serving to transmit 100% of the light conveyed thereto by any one of the primary color filters or complementary percentages of the light conveyed by any two adjacent filters, depending upon the relative rotative adjustment between the filter and shutter structures. To this end, the slots or openings 16 and 17 in the shutters 14 and 15, substantially conform to or have a width equal to the width of a single filter, while the spacing or opaque portions 16' and 17' have a width equal to twice the width of a filter, as shown in the drawing.

This principle of color blending or producing variable hues from a given set of primary or component colors has been described and explained in greater detail in my above-mentioned U. S. patent. As a result, a relative rotative adjustment between the filter cylinder or equivalent multiple cylindrical light source, on the one hand, and the composite shutter 14—15, on the other hand, will result in a continuous and progressive change of the spectral composition of the light emitted by the device starting from pure red through green to blue when using the three standard primary colors, as pointed out above. The adjustment or control may be made either by rotating the filter cylinder (see arrows *a*, Fig. 3), with the shutters 14 and 15 being stationary or, alternatively, the shutters 14 and 15 may be rotated in unison, with the multiple light source or filters remaining in a fixed position, as is readily understood.

In order to achieve a continuous and progressive adjustment of the quality or white saturation of the hues controlled or selected by the relative rotative adjustment of the light sources or filters, on the one hand, and the composite shutter 14—15, on the other hand, or, in other words, to produce the entire range of pastel color shades for the various hues obtainable with a given set of primary or component colors, the solid or opaque portions 16' and 17' of the shutters 14 and 15 are provided with variably transparent areas, such as in the form of additional openings 18 and 20 symmetrical to the openings 16 and 17, respectively, and relatively adjustable to overlap to variable extents between zero and maximum.

More specifically, in the example illustrated, the openings 18 and 20 in the opaque portions 16' and 17' of the shutters 14 and 15 are so designed that a relative movement of the shutters in the longitudinal or axial direction (see arrows *b*, Figures 2 and 3), that is at right angle to the relative movement between the filter and shutter structures (arrows *a*), will result in varying amounts of light of hue complementary to the pure or blended and fully saturated light passed by the openings 16 and 17, to be emitted and mixed or blended with the selected hue, to result in a desired reduction of the saturation or production of the corresponding pastel shades of the spectral colors selected.

Thus, in Figure 2, the shutter 14 is shown to be adjusted longitudinally relative to the shutter 15 to an extent that its openings 18 overlap a given fractional area of the openings 20 in the shutter 15. In this manner, varying degrees of the complementary color, or in turn of white light, from zero to full saturation will be mixed or blended with the colors or hues selected, whereby to enable any desired pastel shade to be reproduced.

As a more specific illustration of the principle described, all the pastel shades of red, i. e. from deep red to pinkish white, may be produced by permitting light to be passed from the red filters 11a, 11b, 11c, etc. through the openings 16 and 17 by a proper relative rotative adjustment of the filter and shutter structures, and by then gradually permitting more and more of the light passed by the green and blue primary filters through the openings 18 ad 20 of the shutters 14 and 15 to blend with the red light by a proper relative longitudinal adjustment of the shutters, in the manner described and understood from the foregoing. Similarly, all pastel shades of green ranging from deep green to greenish white may be produced by blending pure green light with variable portions of blue and red light, while the pastel shades of blue from deep blue to bluish white may be produced by blending pure blue light with variable portions of red and green, by the proper adjustment of the filter and shutter structures. In a similar manner, the pastel shades of the intermediate or composite colors or hues of any two primary colors may be similarly produced by the proper adjustment of the shutter and filter positions, in a manner as will be readily understood from the above.

Figure 4 shows an alternative construction of a variable color source according to the invention, wherein the filter structure is comprised of a plurality of sets of red, blue and green colored filters in the form of annuli or rings 21a—22a—23a, 21b—22b—23b, etc. stacked upon each other to form a closed cylinder. Each of the filters may again form a concave lens for blending the light beams of the primary colors or hues into their composite colors. There are furthermore provided a pair of cylindrical shutters 24 and 25 provided with adjacent sets of peripheral slots 26 and 27, respectively, in register with each other, said slots having a width equal to the width of said filters and being spaced by opaque portions of width equal to twice the width of a filter.

As a result, a relative longitudinal adjustment of the filter and shutter structures of Figure 4 will cause a variable blending or mixing of the primary colors into the composite hue, in substantially the same manner as in the case of Figures 1 to 3. In order to effect a control of the saturation of the color selected, the solid or opaque portions between the slots 26 and 27 are provided with sets of further openings 28 and 29, respectively, arranged to variably overlap by a relative rotative adjustment of the shutters 24 and 25. As a result, the hue selected will be mixed with the desired amount of complementary or white light, to result in the corresponding pastel colors or shades radiated by the device.

The device of Figure 4 is otherwise similar to Figures 1 to 3, the only difference from Figures 1 to 3 being an interchange in the adjusting movements for selecting the spectral colors and saturation, respectively.

In a practical embodiment, the shutters 15, 16, 24 and 25 may consist of cylinders of transparent material, such as synthetic plastic, partially coated with a suitable paint to provide sets of opaque and transparent areas, in the manner shown.

Referring to Figure 5, there is shown a further modification of the invention, comprising a transparent disc or plate divided into a number of adjacent sets of sector-shaped primary elements representing red, blue and green colored filters 31a—32a—33a, 31b—32b—33b, etc. In the example shown, the color disc comprises four sets of tri-color filter segments of substantially equal angular width or area and serving to color the white light emitted by a suitable source such as an electric lamp 30. The shutter structure, in this case, comprises four identical sector-shaped shutter elements 34a, 34b, 34c and 34d, each of an area and shape conforming to two adjacent filters and being spaced by areas equal to that of one of the filters, in a manner analogous to the shutters 14, 15 and 24, 25 of Figures 1 and 4, respectively. Said shutter elements are radially slidably mounted within a pair of containing or mounting rings 35 and 36. Each shutter element is provided with a rack 37a, 37b, 37c and 37d, respectively, meshing with a spiral gear on the underside of an adjusting ring 38 fitting over the retaining ring 35. As a result, relative rotation of the filter and shutter structures, such as by means of an adjusting knob 40' and gear 40 meshing with the toothed periphery 41 of the filter disc, will result in a light emission containing any of the pure or composite spectral colors or hues, provided the shutter elements are each adjusted to their extreme innermost position shown in the drawing.

If the shutter elements 34 are adjusted to a position intermediate the extreme inner position shown and an outer limit position, the shutter segments will permit variable degrees of complementary colors to be emitted, whereby to yield any pastel shades or colors of the primary or composite hues selected by the adjustment of the filters. For the latter purpose, the control ring 38 is shown rotatable by means of an adjusting knob 42' and gear 42 meshing with the peripheral gear teeth 43 of the adjusting ring 38. In this manner, the shutters 34a, 34b, 34c and 34d may be adjusted to any radial position, to thereby vary the saturation of the colors selected.

There is thus provided by the invention a device which is simple in construction and easy to use, whereby any desired hue and saturation of color may be reproduced for colorimetric and other purposes. The adjustments for the hue and saturation may be provided with suitable indicating scales in such a manner, that, if provision is made to stabilize the light emitted by the primary source 10 or 30, any spectral range or hue having a desired degree of saturation can be instantly reproduced, in the manner as will be evident. The indicator and scales may be calibrated directly in spectral range or wave length units and degree of saturation, respectively, thus providing a most simple and economical colorimeter or color matching device.

The colored light emitting elements or sources are advantageously in the form of color filters cooperating with a source of white or composite light and may consist of glass, plastic or a synthetic material containing suitable dies of the respective colors. Alternatively, in place of secondary light sources or filters serving to change the hue of a primary source of white light, the colored light sources may be in the form of differently colored lamps, such as fluorescent lamps, designed to radiate the desired component colors. Accordingly, the term light source as used for the purpose of the present invention is intended to include both primary or secondary sources emitting light of the desired hues.

In the foregoing, the invention has been described with reference to a specific illustrative device. As will be evident, modifications and variations, as well as the substitution of equivalent elements for those shown herein for illustration may be made, in accordance with the scope and spirit of the invention as set forth by the appended claims. The specification and drawings are accordingly to be regarded in an illustrative rather than in a restrictive sense.

I claim:

1. A composite light source comprising a plurality of juxtaposed sets of extended surface light emitters, each of said sets comprising three emitters of equal width and different primary component color, the colors of each set following one another in like order, a shutter arranged parallel to said emitters, said shutter provided with light transmitting portions having a width equal to the width of one of said emitters and alternating with spacing portions having a width equal to twice the width of said emitters, means for relatively adjusting said shutter in a direction transverse to said emitters, and means independent of said first adjusting means for controlling light passing from said emitters, through said spacing portions of said shutter.

2. A composite light source comprising a plurality of sets of segmental primary component color filters of equal angular width, said sets arranged adjoining one another to form a closed cylinder and the colors of each set following one another in like order, a source of substantially white light within said cylinder, a concentric cylindrical shutter in rotating relation to and enclosing said cylinder, said shutter provided with fixed segmental light transmitting portions having an angular width equal to the width of one of said filters and alternating with spacing portions having a width equal to twice the width of said filters, and means for controlling light passing from said emitters through said spacing portions of said shutter.

3. A composite light source comprising a plurality of sets of segmental red, blue and green primary color filters of equal angular width, said sets arranged adjoining one another to form a closed cylinder with the colors of each set following one another in the order mentioned, a source of white light within said cylinder, a pair of superposed concentric cylindrical shutters enclosing said cylinder said shutters arranged to be combinedly rotatable relative to said cylinder and axially displaceable relative to one another, each of said shutters having a first set of registering segmental openings having an angular width equal to the width of a filter and alternating with spacing portions of a width equal to twice the width of said filters, said shutters provided with second registering openings within said spacing portions, said second openings arranged symmetrically between said first openings in variable overlapping relation upon relative axial movement of said shutters, whereby to enable blending of varying amounts of any two of said primary colors into a selected composite color by rotation of said cylinder relative to said combined shutters and varying the degree of white saturation of the color selected by relative axial adjustment of said shutters.

4. A composite light source comprising a plurality of sets of annular red, blue and green primary color filters of equal width and stacked upon one another to form a closed cylinder, the colors of each set following one another in the order mentioned, a source of substantially white light within said cylinder, a pair of superposed concentric cylindrical shutters enclosing said cylinder said shutters arranged to be combinedly axially displaceable relative to said cylinder and rotatable relative to one another, each of said shutters having a first set of registering annular light transmitting portions having a width equal to the width of one of said filters and alternating with annular spacing portions having a width equal to twice the width of said filters, said shutters provided with second registering openings within said spacing portions, said second openings arranged symmetrically to said first openings, whereby to enable blending of variable amounts of any two of said primary colors into a selected composite color by axial displacement of said cylinder relative to said combined shutters and varying the degree of white saturation of the color selected by relative rotation of said shutters.

5. A composite light source comprising a plurality of sets of sector-shaped red, green and blue color filters of equal angular width, said sets arranged adjoining one another to form a disc with the colors of each set following one another in like order, a source of white light on one side of said disc, a shutter on the other side of said disc comprising a plurality of sector-shaped shutter elements one for each of said filter sets, said shutter elements being concentric and parallel to said disc and having an angular width equal to twice the angular width of said filters, first control means for rotatively adjusting said disc, and further control means for simultaneously radially adjusting said shutter elements.

References Cited in the file of this patent

UNITED STATES PATENTS

| | | |
|---|---|---|
| 337,548 | Bacon | Mar. 9, 1886 |
| 1,374,965 | Tate | Apr. 19, 1921 |
| 1,880,026 | Singerman | Sept. 27, 1932 |
| 2,303,196 | Busse | Nov. 24, 1942 |
| 2,515,236 | Kunins | July 18, 1950 |